United States Patent
Lai et al.

(10) Patent No.: US 6,546,448 B1
(45) Date of Patent: Apr. 8, 2003

(54) METHOD AND APPARATUS FOR ARBITRATING ACCESS TO A PCI BUS BY A PLURALITY OF FUNCTIONS IN A MULTI-FUNCTION MASTER

(75) Inventors: Jiin Lai, Taipei (TW); Chau-Chad Tsai, Taipei (TW); Chen-Ping Yang, Taipei (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/440,764

(22) Filed: Nov. 16, 1999

(30) Foreign Application Priority Data

Apr. 23, 1999 (TW) ........................................ 88106503 A

(51) Int. Cl.⁷ ............................................. G06F 13/14
(52) U.S. Cl. ....................... 710/310; 710/313; 710/112
(58) Field of Search ................................ 710/305–315, 710/107–113

(56) References Cited

U.S. PATENT DOCUMENTS

| | | | | |
|---|---|---|---|---|
| 5,764,929 A | * | 6/1998 | Kelley et al. ................ | 710/100 |
| 5,832,241 A | * | 11/1998 | Guy et al. ................... | 710/112 |
| 5,870,567 A | * | 2/1999 | Hausauer et al. ............ | 710/112 |
| 5,884,027 A | * | 3/1999 | Garbus et al. ............... | 370/402 |
| 5,884,052 A | * | 3/1999 | Chambers et al. ........... | 710/107 |
| 5,996,037 A | * | 11/1999 | Emnett ........................ | 710/117 |
| 6,021,483 A | * | 2/2000 | Adar et al . ................. | 710/107 |
| 6,240,475 B1 | * | 5/2001 | Anubolu ..................... | 710/107 |
| 6,282,598 B1 | * | 8/2001 | Manabe ....................... | 710/107 |
| 6,289,406 B1 | * | 9/2001 | Chambers et al. ........... | 370/402 |

* cited by examiner

Primary Examiner—Sumati Lefkowitz
(74) Attorney, Agent, or Firm—J.C. Patents

(57) ABSTRACT

Method and apparatus for arbitrating access to a pci bus by a plurality of functions in a multi-function master. The arbitrating method is performed among the multiple functions of a multi-function master. The arbiter includes a rotating inquiry scheduler (RIS) and a heuristic inquiry initiator (HII). The RIS receives the local inquiry signal from the functional circuit and stores it. According to the local inquiry signal, a bus inquiry signal is generated and sent to the HII, and is sent to the PCI bus to request a use of the PCI bus. If the PCI bus responds a delay transaction termination, the HII can repeatedly send the bus inquiry signal to the PCI bus until the PCI bus grants the privilege to use the PCI bus. The HII then informs the RIS, which arranges the functional circuit to transmit data through the PCI bus.

26 Claims, 6 Drawing Sheets

METHOD AND APPARATUS FOR ARBITRATING ACCESS TO A PCI BUS BY A PLURALITY OF FUNCTIONS IN A MULTI-FUNCTION MASTER

CROSS-REFERENCE TO RELATED APPLICATION

This application claims the priority benefit of Taiwan application serial no. 88106503, filed Apr. 23, 1999.

BACKGROUND OF THE INVENTION

1. Field of the Invention

This invention relates to a computer system using a peripheral component interconnect (PCI) device, and more particularly to PCI bus master and its arbiter with an arbitrating method, in which the PCI master can repeatedly send inquiry signals to a PCI bus after a delay transaction termination is issued on the PCI bus.

2. Description of Related Art

FIG. 1 is a computer system diagram, schematically illustrating a PCI device applied in a computer system. The computer system includes a central processor unit (CPU) 10. which is coupled to a PCI bus 14 through a host bridge 12. Several PCI bus masters, such as a graphic adapter 16a, an expansion bus bridge 16b, a LAN adapter 16c for a use of network, a SCSI host bus adapter 16d for a use for another smaller computer system, and so on are also coupled to the PCI bus. Each PCI bus master can issue a request signal (RST) to use the PCI bus. A bus arbiter in the host bridge 12 then sends a grant signal (GNT) to the PCI bus master to allow the PCI bus master to use the PCI bus 14.

The data communication between PCI compatible devices, such as the PCI bus master or a north bridge of a computer chipset, is typically controlled by an interface control signal, which is described in the following. A cycle frame used to indicate a data access action and its duration is typically generated by an initiator, such as the PCI bus master or the north bridge of the computer chipset. As the cycle frame (FRAME) signal is issued, a data transaction through the PCI bus starts. When the cycle frame signal stays at a low logic level, it means that the transaction is performing. At this stage, during an address phase, an address (AD) bus issues a valid address, and simultaneously sends a valid bus command, which satisfies a PCI format, through a command/byte enable (CBE[3:0]) line so as to instruct the target device to transact data with a data transaction type requested by the initiator. The command/byte enable line includes four bits to have sixteen different commands, each of which has a special purpose and is defined in the PCI bus protocol in detail. After the valid address is issued, the address bus AD sends out the intended data. This period is called a data phase. Simultaneously, immediately after the bus command is issued, a CBE signal with coded commands in the byte is sent out through the CBE line so as to transmit data. As the FRAME signal goes to a high logic level, it means that the last data block of the data transaction is on transmitting status now or the data have been completely transmitted. During read action, an initiator ready (IRDY) signal represents that the initiator is ready for receiving data, and during writing action, a target device ready (TRDY) signal represents that the target device is ready for receiving data. A stop signal is also used to instruct the target device. A STOP signal is used to indicate that the target device requests a stop of data transaction on the initiator.

FIG. 2 is a time waveform sequence, schematically illustrating an operating time sequence during a read action. A bus transaction 20 is defined as a period for use to accomplish a data transaction through the PCI bus. The bus transaction 20 further includes an address phase 22, and several data phases, such as data phases 24a, 24b, and 24c. Each data phase further includes a wait cycle and a data transfer cycle. For example, the data phase 24a/b/c respectively includes a wait cycle 26a/b/c and a data transfer cycle 28a/b/c. Referring to FIG. 2, one can see a read action through the PCI system with related signals described before.

During the first cycle T1 of a clock (CLK), the initiator issues a FRAME signal to start a data transaction. The AD buss sends a start address so as to select a desired target device, and simultaneously send a byte enable command through the CBE line. This byte enable command remains during all data phases 24a, 24b, and 24c. During the second cycle T2, the initiator sends a IRDY signal to indicate the initiator is ready for receiving data. At this moment, the target device is not ready yet so that the wait cycle 26a is needed in the data phase 24a. The initiator stays at a waiting status during the second cycle T2. During the third cycle T3, the target device is ready and sends a TRDY signal to indicate its status. The data phrase 24a turns to the data transfer cycle 28a from the wait cycle 26a. The initiator reads data from the target device in the data transfer cycle 28a, which extends to a fourth cycle T4. During the fourth cycle T4, as data is completely read, the target device changes the status of the TRDY and prepares the second data block. At this moment, the data phase 24b starts and stays at the wait cycle 26b. During a fifth cycle T5, the target device sends the TRDY signal again to start a read of the second data block. The initiator read the second data block during the data transfer cycle 28b. In case that the initiator cannot read the second data block in time, the initiator send an unready IRDY signal at a sixth cycle T6. In this situation, since the TRDY still stays at ready status, the wait cycle 26c of the data phase 24c is caused by the initiator. During a cycle T7, the initiator may be ready again and read the second data block again. The second read block is completely read during a cycle T8. Since the FRAME signal has indicated the second data block is the last data block to be ready. The read action stops at the cycle T8. Both the IRDY and the TRDY change to unready status. Accordingly, the CBE signal and the AD signal are off.

In this conventional action, only one PCI bus master can use the PCI bus at a bus transaction. So, before performing one of functional devices of a multi-function master, the master should receive a use privilege to use the PCI bus. However, in some simple system, the multiple-function master does not release its use privilege after the data transaction finishes.

FIG. 3 is a system block diagram, schematically illustrating a conventional multi-function master, which is compatible with the PCI bus. FIG. 4 is a time sequence, schematically illustrating a conventional arbitrating method used by the conventional multi-function master of FIG. 3 to transmit data.

In FIG. 3, there is a PCI bus 40. A multi-function master 30 is coupled to the PCI bus 40. The multi-function master 30 includes an arbiter 32 and several functional circuits 34, 36, and 38, in which the arbiter 32 is different from the bus arbiter 31. The bus arbiter 31 is used to arbitrate all PCI masters (some are not shown) coupled to the PCI bus 40 so as to provide a use privilege to one of the PCI masters. The arbiter 32 is used to arbitrate which one of the functional circuits 34, 36, and 38 has a privilege to use the multi-function master 30. For example, as the multi-function master 30 obtain its use privilege authorized by the arbiter 31, one of the functional circuits 34, 36, and 38 also needs an authorization from the arbiter 32 so as to used the PCI bus 40.

Some of the functional circuits can be coupled to peripheral apparatus. For example, the functional circuits 34 and 36 are also respectively coupled to a peripheral apparatus 33 and a peripheral apparatus 35. The functional circuits 34 and 36 include, for example, various interface control circuits, such as a communication interface, a simple I/O interface to match the peripheral apparatuses 33 and 35. The functional circuit 38 is built in the multi-function master 30 to independently perform its special function, such as a digital signal processor (DSP). Moreover, a peripheral apparatus 42 can also coupled to the arbiter 32 to directly communicate with the arbiter 32.

Typically, as the peripheral apparatus 33 intends to read data, the functional circuit 34 sends a request signal to the arbiter 32 to make a request. If the arbiter 32 grants the request of the functional circuit 34, the arbiter 32 of the multi-function master sends a request signal to the PCI bus 40 to request a use of the PCI bus 40. If the PCI bus 40 is not used by the other PCI master, the bus arbiter 31 sends a grant signal to the multi-function master 30 to give its privilege to use the PCI bus 40. Then, functional circuit 34 can send its request signal to the PCI bus 40 through the arbiter 32 and wait for data response. At this moment, if the other functional circuits 36, 38 or the peripheral apparatus 42 do also intend to use the PCI bus 40, they are sequentially authorized and wait until the previous action finishes.

When the data requested by the functional circuit 34 are ready, the functional circuit 34 starts to receive data from the PCI data bus 40 and transmit the data to its peripheral apparatus 33. The PCI bus 40 therefore is occupied by the functional circuit 34. In FIG. 3 and FIG. 4, when the functional circuit 34 is granted to use the PCI bus 40 at the time A, a period of time TA of the PCI bus is occupied by the functional circuit 34. In this period of time TA, an actual data transaction only uses a time of period TA1, which is about a half of the TA, resulting in a time consumption.

After the functional circuit 34 has completely received the desired data, the PCI bus 40 is still occupied by the multi-function master 30 except the bus arbiter 31 stops its authorization to the multi-function master 30. In this situation, the arbiter 32 continuously and sequentially grants, for example, the functional circuit 38 and the peripheral apparatus 42 for their data acquisition. In FIG. 4, TB and TC respectively represent the time occupied by the functional circuit 38 and the peripheral apparatus 42. Similarly, both the TB and TC use only about a half time for actual data transaction. After all requests of the multi-function master 30 has finished its data transaction, the multi-function master 30 then release its privilege on the PCI bus 40. The other PCI master then can use the PCI bus 40.

In the above operation example, the functional circuits 34 and 38 and the peripheral apparatus 42 use a total time T on the PCI bus 40. In this totally used active time T of the PCI bus 40, about a half of the active time is consumed without any action. The data transaction efficiency therefore is about 50% only. This is an inefficient performance.

Moreover, a current target device on the PCI bus 40, particularly like a host bridge, which includes the arbiter 31, usually has a multi-delay function. According to the conventional operation described above, the active time of the PCI bus 40 is greatly expended, and each of the functional circuits 34, 36, 38 and the peripheral apparatus 42 should sequentially acquire their desired data. A data transaction may be very simple further degrades the integrated performance of the PCI system. It is really necessary to modify the arbiter 32 of the multi-function master 30 and its arbitrating algorithm.

SUMMARY OF THE INVENTION

It is at least an objective of the present invention to provide a PCI bus master and its arbiter with an arbitrating method so as to reduce an occupation time on a PCI bus. The use efficiency of the PCI bus is improved.

It is at least another an objective of the present invention to provide a PCI bus master and its arbiter with an arbitrating method so as to allow several requests to use the PCI bus to be simultaneously sent to the PCI bus for preparation of various types of data. All the desired data having been prepared to be ready for acquisition have privilege to use the PCI bus. There is no need to sequentially wait for the necessary privilege. As a result, a delay time is averaged down so that the integrated performance is efficiently improved.

In accordance with the foregoing and other objectives of the present invention, a PCI bus master and its arbiter with an arbitrating method is provided. The PCI master includes at least one functional circuit and an arbiter. The functional circuit send a local inquiry signal to the arbiter to request a use of the PCI bus. The arbiter includes a rotating inquiry scheduler (RIS) and a heuristic inquiry initiator (HII). The RIS receives the local inquiry signal from the functional circuit and stores it. According to the local inquiry signal, a bus inquiry signal is generated and sent to the HII, and is sent to the PCI bus to request a use of the PCI bus. If the PCI bus responds a delay transaction termination, the HII can repeatedly send the bus inquiry signal to the PCI bus until the PCI bus grants the privilege to use the PCI bus. The HII then informs the RIS, which arranges the functional circuit to transmit data through the PCI bus.

In the foregoing, the RIS at least includes an inquiry queue and a response queue. As the RIS receives the local inquiry signal from the functional circuit, the RIS stores the local inquiry signal to the inquiry queue. Then, the RIS generates the bus inquiry signal, according to the local inquiry signal, and send the bus inquiry signal to the HII. The HII, according to the bus inquiry signal, obtains a privilege from the PCI bus. When the bus inquiry signal is sent to the PCI bus, the RIS then removes the local inquiry signal stored in the inquiry queue and alternatively stores the local inquiry signal to the response queue. As the PCI bus response is not the delay transaction termination, the RIS, according to the local inquiry signal stored in the response queue, setups a data transmission route to allow the functional circuit to transmit data through the PCI bus. The RIS also clears the local inquiry signal stored in the response queue after that.

The HII described above at least includes a buffer circuit, a register, and a time counter, in which the buffer circuit is coupled to the RIS. The buffer circuit also receives and temporarily stores the bus inquiry signal. According to the bus inquiry signal, the HII sends a PCI bus inquiry signal to the PCI bus. The time counter, which is coupled to the buffer circuit and the register, informs the buffer circuit, according to a delay time, or called a latency, stored in the register. The buffer circuit therefore repeatedly sends the bus inquiry signal to the PCI bus for continuous inquiry. The buffer circuit further includes an address cache memory and an adder. The address cache memory can fast access the address information carried by the bus inquiry signal. The adder, according to the address information carried by the bus inquiry signal or the received bus inquiry signal from the RIS, sends the PCI bus inquiry signal to the PCI bus.

The HII can include, for example, several HII units, each of which respectively includes a buffer circuit, a register, and a time counter with the coupling structure described above so that the HII can simultaneously process several bus inquiry signals. Moreover, the HII further includes a HII adder, which is coupled to the buffer of each HII unit. The HII adder sequentially sends the PCI bus inquiry signals to the PCI bus, according to the inquiry signals.

Moreover, a method for the HII to set each delay time of the inquiry signals includes initializing each delay time equal to a presetting delay time. The time counter informs each buffer circuit to re-send each of the PCI bus inquiry signals. If the PCI bus response is not a delay transaction termination and its responded delay time is greater than the presetting delay time, a delay decrement is subtracted from the current delay time so as to obtain a next delay time. If the second PCI bus response is a delay transaction termination, the current delay time is added with a delay increment to obtain the next delay time, which becomes the delay time for the next inquiry. The delay time is continuously adjusted until the desired data are transmitted.

In order to achieve the foregoing and other objectives of the present invention, an arbitrating method used for a compatible PCI bus master is provided. The arbitrating method provides several functional circuits respectively issuing several local inquiry signals to request a use of the PCI bus. The local inquiry signals are sequentially stored, and several PCI bus inquiry signals are accordingly produced and sent to the PCI bus. As a PCI bus response is a delay transaction termination, the same PCI bus inquiry signal corresponding to the one that gets the delay transaction termination is repeatedly sent to the PCI bus until the PCI bus response is not the delay transaction termination. As the PCI bus response is not the delay transaction termination, a granted functional circuit starts to fetch data through the PCI bus.

The arbitrating method used for a compatible PCI bus master further includes several steps. A delay time is provided. After the PCI bus responds a delay transaction termination, a waiting time starts to be counted. As the waiting time equals to the delay time, the same PCI bus inquiry is re-sent to the PCI bus. An initial delay time is first provided by setting it to a presetting delay time. The initial delay time is adjusted after each time of inquiry. If the PCI bus response of a second inquiry is not a delay transaction termination, a current delay time is greater than an actual delay responded from the target device, a new delay time is set by subtracting a delay decrement from the previous delay time. If the PCI bus response of the second inquiry is a delay transaction termination, a new delay time is set by adding a delay increment to the previous delay time. These subtracting and adding processes are continuously performed until the desired data is able to be transmitted.

Thin invention provides a compatible PCI bus master and its arbitrating method, in which the PCI bus master includes several arbiters so as to simultaneously process several PCI bus inquiry signals, which are repeatedly sent to the PCI bus. In this manner for the PCI bus master with multi-function capability, once the transaction data are ready, they have a chance to use the PCI. As a result, the PCI bus is more efficiently used by the multiple functional circuits, the active time is effectively increased, and the averaged delay time for each functional circuit is effectively reduced.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

A PCI bus specification, such as its version 2.1, includes a delayed transaction method in a data transaction. The delayed transaction is a subsequent operating process as a target determined by the PCI bus cannot accomplish its initial data phase. The delay transaction basically includes two main devices that are an I/O controller and a bridge. Generally, the I/O controller can only process one delayed transaction at a time, and the bridge can process multiple delayed transactions so as to improve the transaction efficiency.

The delayed transaction includes three phases. The first phase includes that the PCI master makes a request through the PCI bus for access a target device. After a target device memory stores the content of the request, the target device may start a target initiated termination with retry, that is, a delay transaction termination so as to automatically stop the request. The second phase includes that the target device prepares the requested data for transaction. The third phase includes that the PCI master re-sends the request to obtain an access on the target device in order to accomplish the data transaction. During the data transaction period, the PCI master occupies the PCI bus and repeatedly sends a request signal to perform a polling-like operation on the target device.

Figure 8:
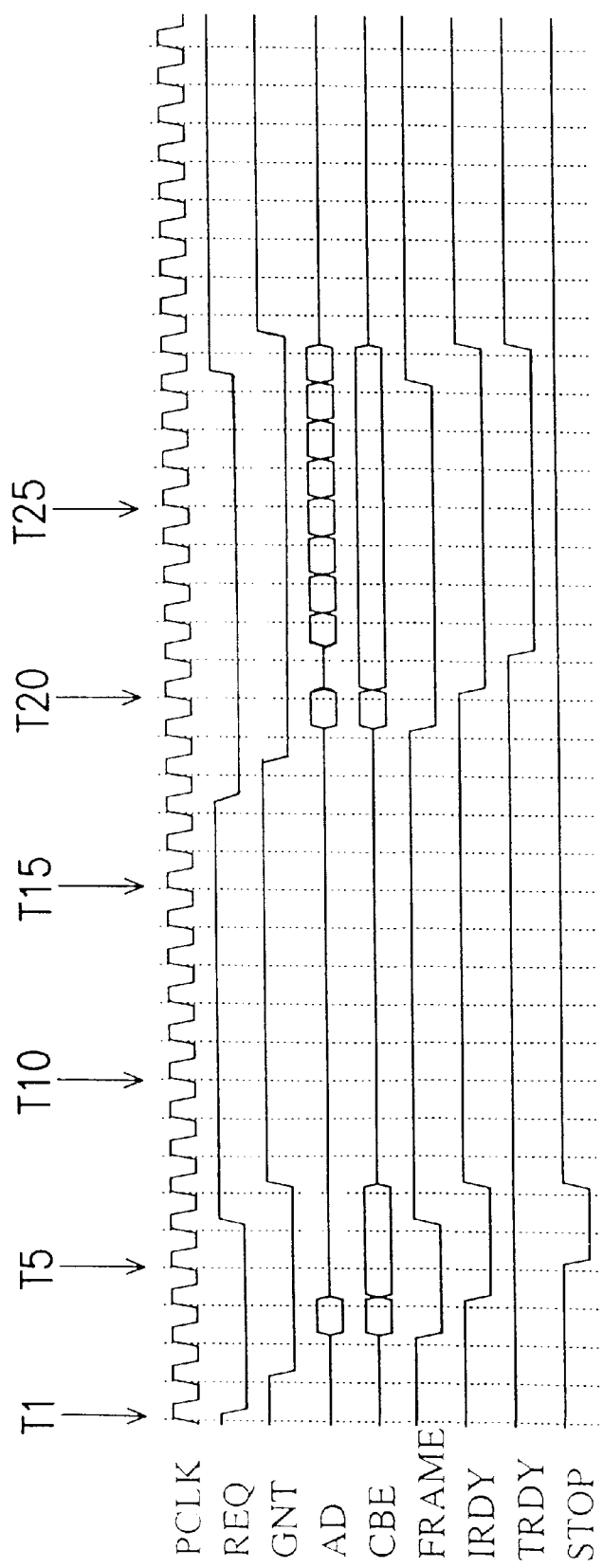
FIG. 8 is a time sequence plot, schematically illustrating an operation of a delayed data transaction for the PCI bus master.

FIG. 8 is a time sequence plot, schematically illustrating an operation of a delayed data transaction for the PCI bus master. In FIG. 8, at the first cycle T1, the PCI master send a request signal REQ to request a use of the PCI bus so as to obtain desired data from the target device. At the cycle T2, a host bridge with a bus arbiter responds a grant signal GNT to accept the PCI master. At the cycle T3, the PCI master sends a FRAME signal to start a data transaction, and sends an address AD through an address bus to assign the target device, in which an data access command on the target device is immediately executed. If the target device cannot be ready for providing the desired data in one cycle period, the target device then send a stop signal STOP at the cycle T5 to terminate the request. The PCI master drop the REQ and the FRAME signals at, for example, the cycle T6. The grant GNT signal is also cleared at the cycle T7 so that the occupation of PCI bus is released. This operation is called the delay transaction termination.

Continuously, the target device prepares the related desired data to be ready for access, and waits for the access command issued by the PCI master to accomplish the data transaction. For example, at the cycle T17, the PCI master sends a REQ signal to the PCI bus again. At the cycle T18, a grant signal GNT is issued to accept the PCI master request. At the cycle T19, the PCI master sends a FRAME signal to start the data transaction, and the same address AD and the same access command are sent. At this stage, the PCI master and the target device respectively drive an IRDY signal and a TRDY signal for the data transaction. If the target device cannot fast prepare all desired data at once in time, the PCI master continuously occupies the PCI bus and repeatedly sends a request signal to perform a polling-like operation on the target device. The PCI master does not release its occupation on the PCI master until the desired data are completely transmitted. This causes an inefficient use on the PCI bus. A large delay time also occurs due to all the various data transactions are sequentially performed.

Figure 1:
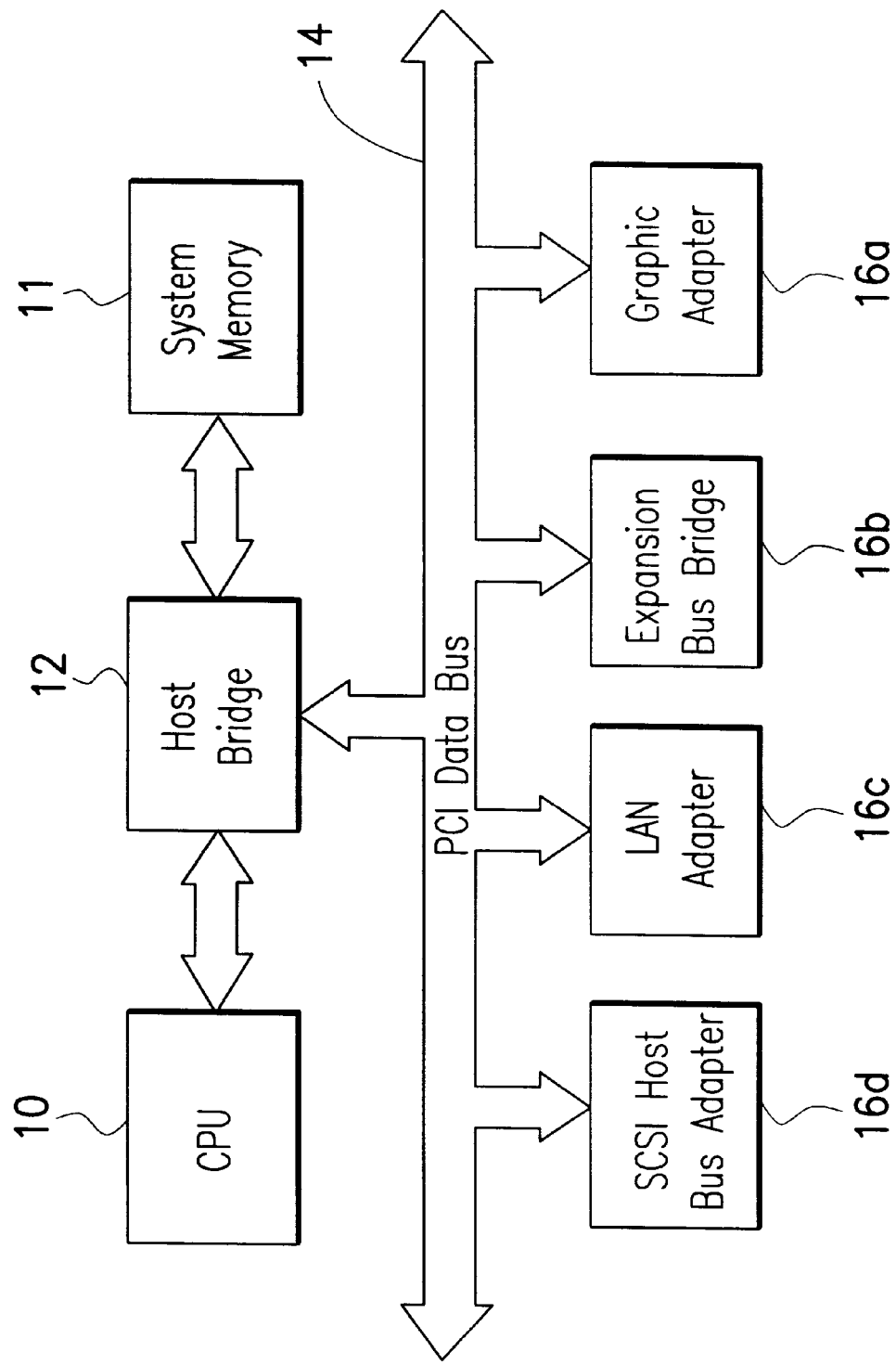
FIG. 1 is a computer system diagram, schematically illustrating a PCI device applied in a computer system.
Figure 2:
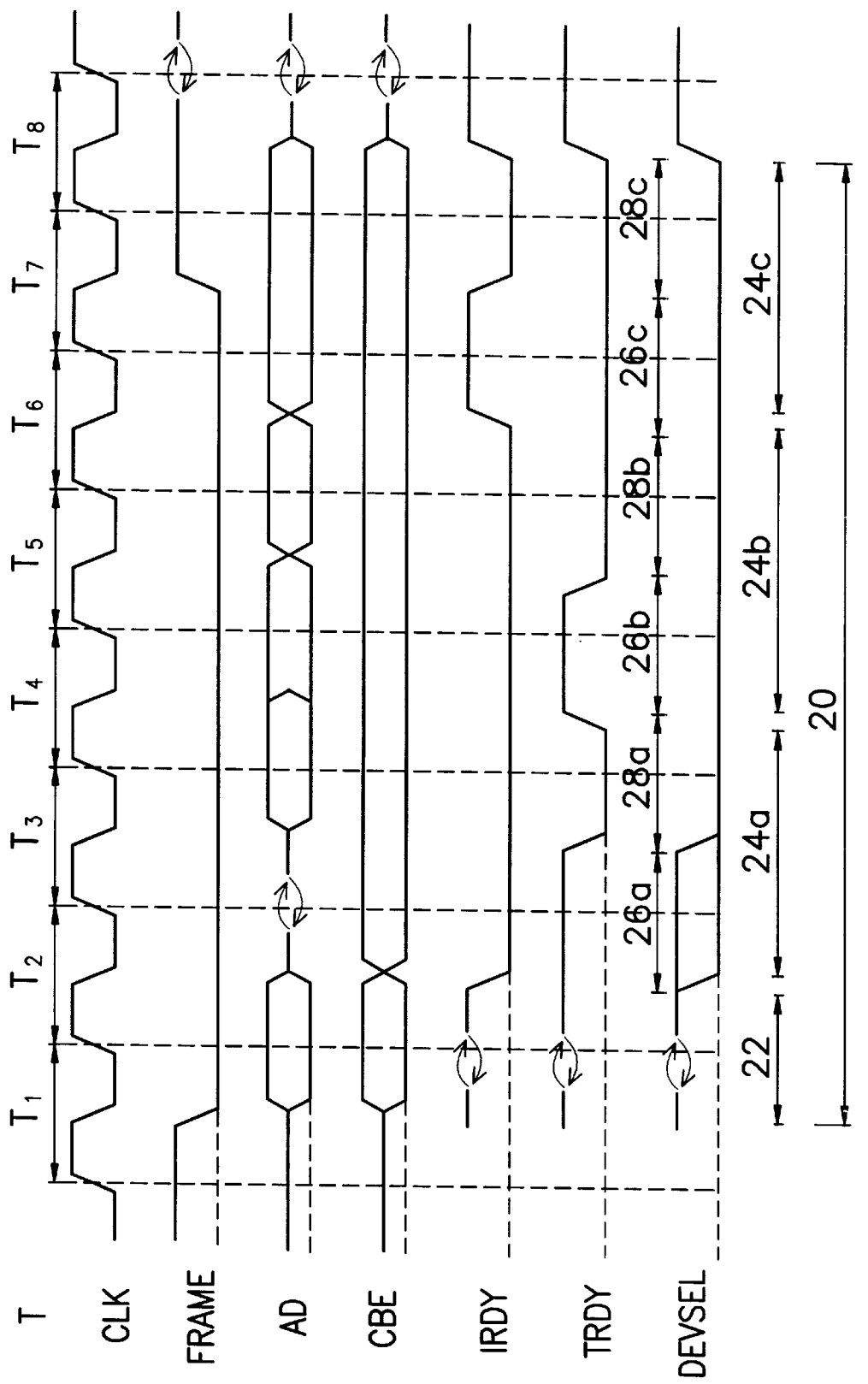
FIG. 2 is a time waveform sequence, schematically illustrating an operating time sequence during a read action.
Figure 3:
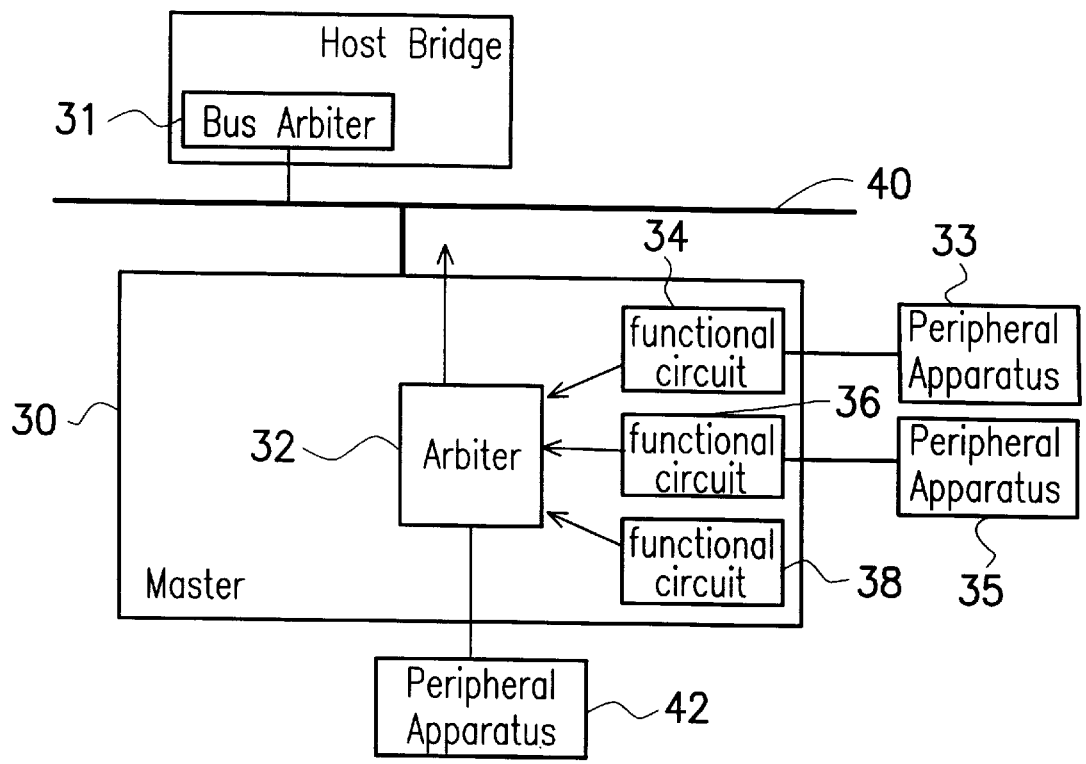
FIG. 3 is a system block diagram, schematically illustrating a conventional multifunction master, which is compatible with the PCI bus.
Figure 4:
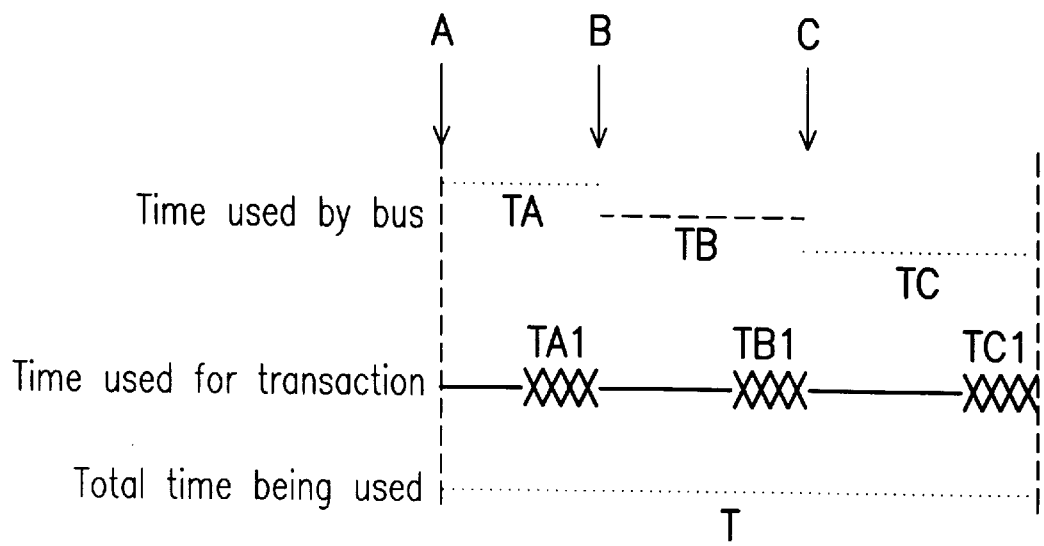
FIG. 4 is a time sequence, schematically illustrating a conventional arbitrating method used by the conventional multi-function master of FIG. 3 to transmit data.
Figure 5:
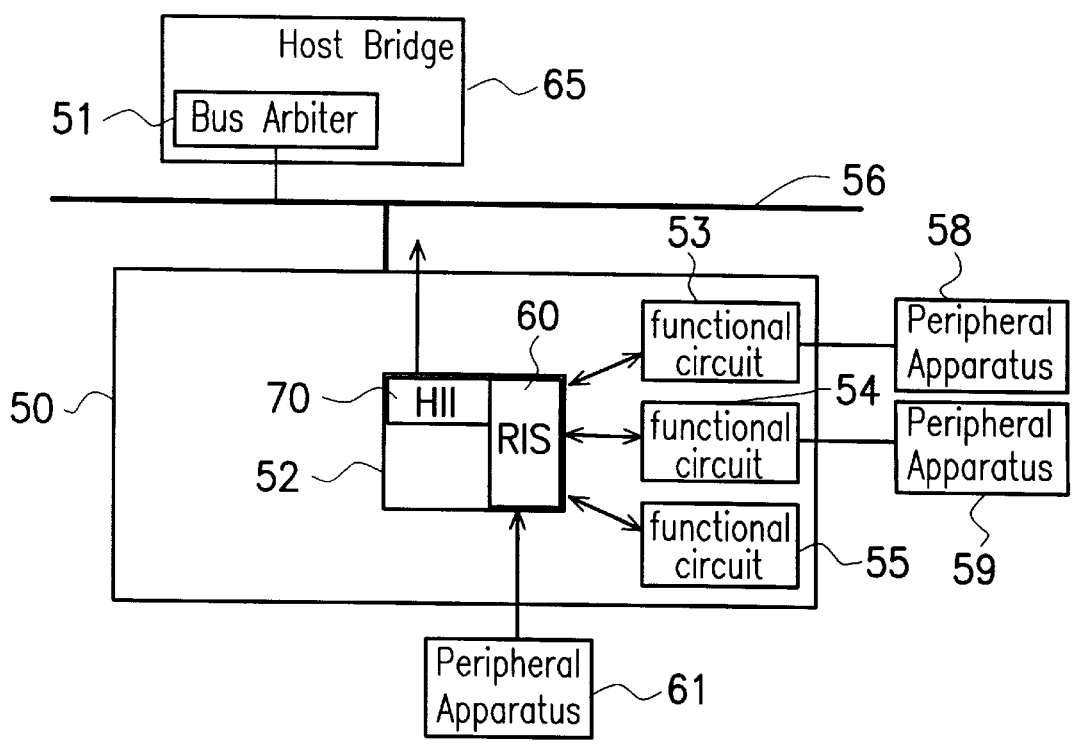
FIG. 5 is a system block diagram, schematically illustrating a multi-function PCI bus master, according to a preferred embodiment of the invention.

FIG. 5 is a system block diagram, schematically illustrating a multi-function PCI bus master, according to a preferred embodiment of the invention. A PCI master 50 provided by the invention has a main improvement on an arbiter 52, which is different from the conventional arbiter 32 of FIG. 3. Due to the improvement of the arbiter 52, an more efficient arbitrating method is also allowed. The arbiter 52 includes, for example, a rotating inquiry scheduler (RIS) 60 and a heuristic inquiry initiator (HII) 70. Moreover, the invention also includes the delayed transaction function, and particularly includes a multiple delayed transaction, which is achieved by a host bridge 65 with a bus arbiter 51.

The PCI master 50 coupled to a PCI bus 56 includes the arbiter 52 and at least one functional circuit with its individual various function. For example, three functional circuits 53, 54, and 55 are included. A coupling between the arbiter 52 and the functional circuits 53, 54, and 55 can be achieved by either though a bus type, separate circuits or any communicating coupling structure. The communication protocol can be one satisfying the PCI bus specification or any specification for a special interface device. The arbiter 52 and the bus arbiter 51 are different. The bus arbiter 51 is used to arbitrate the PCI master 50 and other masters (not shown) for a grant to use the PCI bus 56. The arbiter 52 is used to arbitrate the functional circuits 53, 54, and 55 to use the PCI master 50. For example, the PCI master 50 must obtain a grant from the bus arbiter 51 to use the PCI bus 56, and the functional circuits 53, 54, and 55 must obtain their grant from the arbiter 52 to use the PCI bus 56.

Moreover, the functional circuits 53 and 54 can includes various control circuits, for example, for a communication interface, a simple I/O interface, any peripheral apparatus interface, and so on. The functional circuits 53 and 54 are, for example, respectively coupled to a peripheral apparatus 58 and a peripheral apparatus 59. The functional circuit 55 can be any internal circuit, such as a digital signal processor (DSP), that is independently operated for a special purpose. Moreover, a peripheral apparatus 61 is directly coupled to the arbiter 52 because it satisfies the interface specification of the arbiter 52. The peripheral apparatus 61 is coupled and the functional circuits 53, 54, and 55 are usually coupled to the arbiter 52 at its RIS 60.

Figure 6:
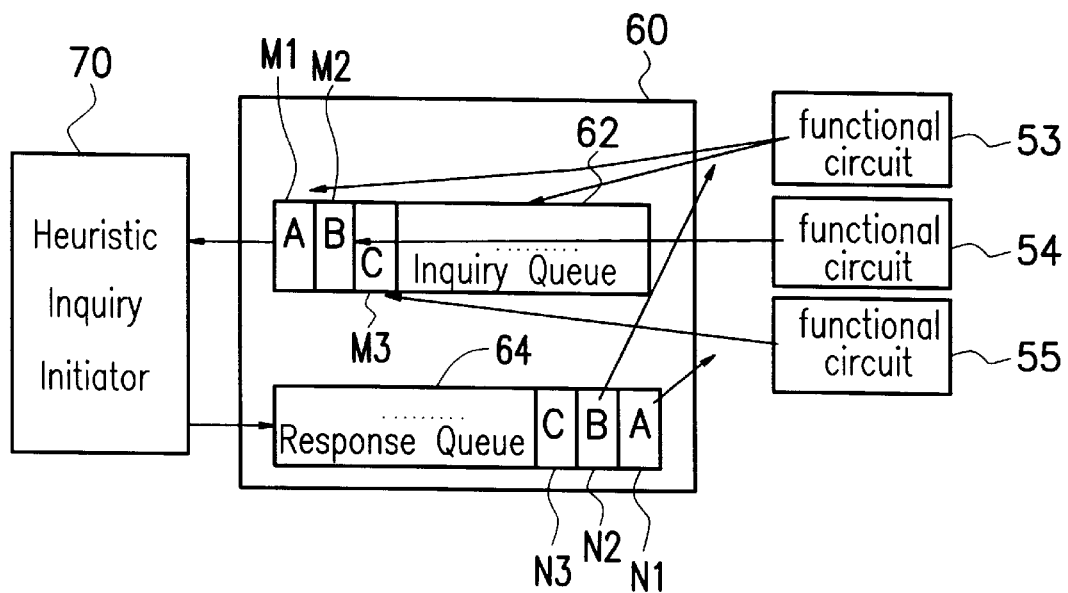
FIG. 6 is a system block diagram, schematically illustrating a rotating inquiry scheduler in the arbiter, according to the preferred embodiment of the invention.
Figure 7:
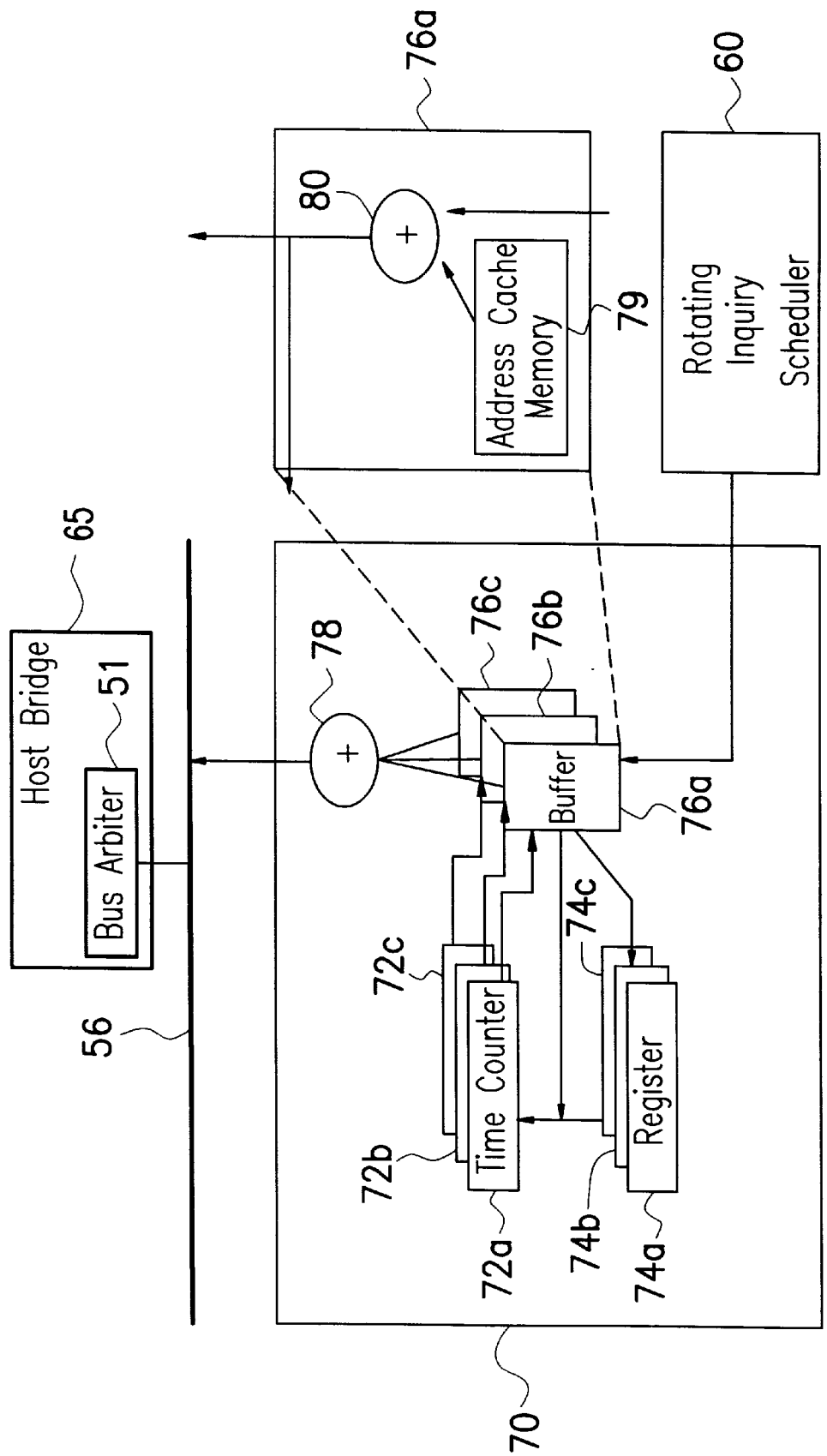
FIG. 7 is a system block diagram, schematically illustrating a heuristic inquiry initiator in the arbiter, according to the preferred embodiment of the invention.

FIG. 6 is a system block diagram, schematically illustrating a rotating inquiry scheduler in the arbiter, according to the preferred embodiment of the invention. FIG. 7 is a system block diagram, schematically illustrating a heuristic inquiry initiator in the arbiter according to the preferred embodiment of the invention. In FIGS. 5, 6, and 7, the RIS serving as an inquiry signal collector includes at least an inquiry queue 62 and a response queue 64. The inquiry queue 62 is used to receive and store local inquiry signals, which usually include target-device addresses from the peripheral apparatus 61 or the functional circuits 53, 54, and 55. In accordance with the content of the local inquiry signals, the inquiry queue 62 sequentially sends several bus inquiry signals to the HII 70. Sometime the local inquiry signals are the same as the bus inquiry signals. It depends on a practical use. According to the bus inquiry signals, the HII 70 obtains a grant from the PCI bus 56 and successfully sends the bus inquiry signals to the PCI bus 56. After that, the RIS 60 removes the related local inquiry signals stored in the inquiry queue 62 and stores the removed local inquiry signals to the response queue 64. The PCI master 50 then waits for the desired data to be transmitted. Once the desire data are ready to be transmitted, the RIS 60 setups a transmission route to transmit the desired data. The related local inquiry signal is deleted.

In FIG. 7, the HII 70 performs the last stage of the inquiry process. The HII 70, which is different from a typical request initiator, a series of logic units and a simple algorithm system. So, the HII 70, for example, includes several time counters 72a–72c, several registers 74a–74c, several buffer circuits 76a–76c, and an adder 78, in which each of the buffer circuits 76a–76c includes, for example, an address cache memory 79 and an adder 80. The adders used for descriptions can be a general arithmetic operator to do desired arithmetic operations. Each of the buffer circuits 76a–76c is also coupled to the adder 78. The address cache 79 is used to fast obtain the address information carried in the bus inquiry signal. The adder 80 is used to store the bus inquiry signal, which may be the one related the address information or the one just arriving to the HII 70, and send an PCI bus inquiry signal to the PCI bus 56. Each of the registers 74a–74c stores a presetting delay time, or called a latency, which depends on various target devices. The time counters 72a–72c are used to inform the buffer circuits 76a–76c, according to the delay time in the registers 74a–74c, so that each of the buffer circuits 76a–76c re-send the related PCI bus signal to the PCI bus 56 through, for example, the adder 78 to inquire if the desired data prepared by the target device are ready. Here, one time counter, one register, and one buffer circuit form one HII unit. In this example of FIG. 7, there are, for example, multiple HII units, such as three. The adder 78 is coupled to each of the buffer circuits 76a–76c and is used to sequentially send the PCI bus signals to the PCI bus 56. For a simplest application, there is only one HII unit, then the adder 78 is not necessary. In some situation, some PCI bus inquiry signals are the same as the original bus inquiry signals.

In FIGS. 5–7, as an example, if the peripheral apparatus 58 makes a request to fetch data, the functional circuit 53 accordingly sends a local inquiry signal A to the arbiter 52. The RIS 60 of the arbiter 52 puts the local inquiry signal A to the inquiry queue 62 at the first location Ml, and also transmits a bus inquiry signal, relevant to the local inquiry signal A, to the HII 70 at its buffer circuit 76a. If the functional circuits 54 and 55 do also sequentially send local inquiry signals B and C to the arbiter 60, the local inquiry signals B and C are similarly stored at the locations M2 and M3. This action can be repeatedly operated until the inquiry queue 60 is full.

The first HII unit of the HII 70 including the time counter 72a, the register 74a, and the buffer circuit 76a is used for descriptions. As the buffer circuits 76a receives the bus inquiry signal from the RIS 60, the buffer circuits 76a makes a request to use the PCI bus 56 so as to send a PCI bus inquiry signal, relevant to the received bus inquiry signal, to the PCI bus 56. After a successful transmission of the PCI bus inquiry signal, the RIS 60 removes the local inquiry signal A stored in the inquiry queue 62 and simultaneously sends the local inquiry signal A to the response queue 64 at the first location N1. The RIS 60 then waits for a response. The PCI bus, at this time, is released so that other PCI master can use the PCI bus 56.

In the invention, the host bridge 65 is designed to have delayed transaction ability or multiple delayed transaction ability. If the host bridge 65 is the target device of all various functional circuits for their data transactions, the host bridge 65 immediately responds a delay transaction termination as it receives the PCI bus inquiry signal relevant to the local inquiry signal A, and starts to prepare the requested data with respect to the local inquiry signal A. Similarly, if the local signals B and C are also sequentially sent to the HII 70, they are respectively processed by the buffer circuit 76b of a second HII unit and the buffer circuit 76c of the third HII unit. After the buffer circuits 76a and 76b successfully send the PCI bus inquiry signals, relevant to the local inquiry signals B and C, to the PCI bus 56, the local inquiry signals B and C are respectively moved to the response queue 64 at the second locations N and the third location N3. The RIS 60 then stays at a waiting status and releases the privilege to use the PCI bus 56.

The register 74a stores a latency of the target device, such as the host bridge, at the beginning to serves as an initial delay time. If the buffer circuit 76a receives a delay transaction termination response from the PCI bus 56, the time counter 72a starts to count a counted delay time. When the counted delay time equals to the initial delay time stored in the register 74a, the time counter 72a informs the buffer circuit 76a to resend the PCI bus inquiry signal, relevant to the local inquiry signal A, to the PCI bus 56 to inquire the host bridge 65 whether or not the data are ready to be fetched. If the second inquiry gets a ready response, which means that the PCI bus response is not the delay transaction termination, and the counted delay time equals to an actual delay time for preparing the desired data, the initial delay time stored in the register 74a remains the same. If the second inquiry gets a ready response but the counted delay time is greater than the actual delay time, the initial delay time stored in the register 74a is subtracted by a delay decrement, which usually is a small quantity. In this situation, the initial delay time stored in the register 76a is updated to be a new delay time, which serves another initial delay time for the next data transaction. If the second inquiry still gets a delay transaction termination, which means that the data are not ready yet, the current delay time stored in the register 76a is added with a delay increment. Then, the time counter 72a repeats the inquiry processes with the same algorithm until the data are ready for transmission.

Therefore, a request of the HII 70 is sent to the host bridge 65 through the PCI bus 56. When the host bridge 65 accomplishes its preparation of data, the host bridge 65 responds a ready status to the PCI bus, which means that the PCI bus response is not the delay transaction termination. As, for example, the buffer circuit 76a obtains the ready status, the buffer circuit 76a informs the RIS 60, which setups a proper data transmission route starts a data transmission through the PCI bus. When data are completely transmitted, the relevant local inquiry signal stored in the response queue 64 is deleted. In the foregoing, the HII 70 can sequentially send all of the PCI bus inquiry signals made by all various functional circuits 53–55 or the peripheral apparatus 61 to the host bridge 65. After all of PCI bus inquiry signals are completely send, the host bride 65 sends the top signal STOP and release the PCI bus. The host bridge 65 starts to prepare the data for each PCI bus inquiry signal. The various data transactions requested by the functional circuits or the can be parallel processed. This is one characteristic of the invention. In the conventional situation, the various data transactions are necessary to be sequentially processed. For example, the second data transaction has to wait until the first data transaction is complete. This characteristic of the invention is achieved by the arbiter 52 with the host bridge 65, which is designed to have a multiple delayed transaction ability.

In summary, the invention provides a compatible PCI master with the arbitrating method. The arbitrating method includes providing several functional circuits, which can be internal functional circuits inside the PCI master or external peripheral circuits. The functional circuits respectively issues several local inquiry signals to request their privileges to use the PCI bus. The local inquiry signals are sequentially stored, and several bus inquiry signals are accordingly produced, in which some bus inquiry signals can be the same as the relevant local inquiry signals. The bus inquiry signals are temporarily stored, and several PCI bus inquiry signals are generated and sent to the PCI bus. As a PCI bus response is a delay transaction termination, the same PCI bus inquiry signal corresponding to the one that gets the delay transaction termination is repeatedly sent to the PCI bus until the PCI bus response is not the delay transaction termination. This means that the data are ready for transmission. The granted functional circuit starts to fetch data through the PCI bus, according to the content of the relevant PCI bus inquiry signal.

The arbitrating method used for a compatible PCI bus master further includes several steps. A delay time is provided. The delay time preferably is provided a register in the example of the invention. After the PCI bus responds a delay transaction termination, a counted delay time starts to be counted. As the counted delay time equals to the provided delay time, the same PCI bus inquiry is re-sent to the PCI bus to inquire if the data is ready or not. An initial delay time is provided by setting it to a presetting delay time. The initial delay time is adjusted after each time of inquiry. If the PCI bus response is not a delay transaction termination and a PCI responded delay time is greater than the initial delay time, a new delay time is set by subtracting a delay decrement from the previous delay time. If a subsequent PCI bus response is a delay transaction termination, a new delay time is set by adding a delay increment to the previous delay time.

In this manner, it is avoided that the PCI bus inquiry signal is too often sent to the PCI bus to cause an extra consumption of the PCI bus, or is sent to the PCI bus with an insufficient rate to cause extra delay of waiting time. In general, if the purpose is more concentrated on the PCI system so as to allow all PCI masters to have better balancing delay time, the delay increment is preferred to be greater the delay decrement. On the other hand if the delay time of the PCI master is more concerned, the delay increment is preferred to be less the delay decrement.

When the multiple functional circuits simultaneously make their request to have data transactions, the functional circuits need only to send their local inquiry signals once to the RIS 60 of the arbiter 52. The RIS 60 then deals with the HII 70 to arrange with the target device, such as the host bridge 65 to get the data be ready. The functional circuits can obtain their desired data through the arrangement of the arbiter 52. In the conventional situation, the data transactions are necessary to be sequentially processed. Moreover, the occupation time of the PCI bus in the invention includes only inquiry time and the actual data transition time. The PCI bus has more available active time, which can be used by the other PCI masters or other uses. The use efficiency of the PCI bus is effectively improved.

In conclusion, the invention has several characteristics as follows:

1. Several requests to use the PCI bus can be sent in parallel. In the conventional situation, the requests are necessary to be sequentially sent, in which the next request has to wait until the previous request is done. If the requests are fail due to data being not ready, the requests, according to a varying delay time, are repeatedly sent to the PCI bus. As a result, a first ready data has a chance to use the PCI bus. An average delay time for each functional circuit is effectively reduced.

2. The delayed transaction method of the PCI bus specification is applied in the invention through the host bridge so that the PCI bus is immediately released as the requests is sent to the PCI bus. In the whole data transaction, the PCI bus is only occupied during inquiry and actual data transmission. The PCI bus can therefore be more efficiently used.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A compatible bus master, coupled to a bus, said compatible bus master comprising:
    a plurality functional circuits, used to issue a local inquiry signal so as to request a data transmission on said bus; and
    an arbiter, comprising a rotating inquiry scheduler (RIS) coupled to said functional circuits and a heuristic inquiry initiator (EH) coupled to said RIS and said bus,
    wherein said RIS receives and stores said local inquiry signal, produces a first bus inquiry signal, according to said local inquiry signal, and sends said bus inquiry signal to said HII, which sends a second bus inquiry signal, according to said bus inquiry signal, to said bus, in which said HII repeatedly sends said second bus inquiry signal to said bus to inquire a data status if said bus responds with a delay transaction termination, and said HII informs said RIS to perform said data transmission if said bus does not response with a delay transaction termination.

2. The bus master of claim 1, wherein said RIS comprises an inquiry queue and a response queue, in which after said RIS receives said local inquiry signal issued by said functional circuits and stores it to said inquiry queue, said RIS sends said first bus inquiry signal, according to said local inquiry signal, to said HI, which is to get an authorization from said bus so as to send said second bus inquiry signal to said bus, and after said second bus inquiry signal is sent to said bus, said RIS removes said local inquiry signal stored in said inquiry queue and stores said local inquiry signal to said response queue.

3. The bus master of claim 2, wherein if said bus does not response with said delay transaction termination, according to said local inquiry signal stored in said response queue, said RIS makes a data transmission route for said data transmission through said bus and clears said local inquiry signal stored in said response queue.

4. The bus master of claim 1, wherein said HII comprises:
    a buffer circuit, coupled to said RIS so as to receive and temporarily store said first bus inquiry signal, and sends said second bus inquiry signal to said bus, according to a designation of said first bus inquiry signal;
    a register, used to store a delay time; and
    a time counter, which is coupled to said buffer circuit and said register, and is used to count a used time so that when said used time equals to said delay time, said time counter informs said buffer circuit to re-send said second bus inquiry signal to said bus.

5. The bus master of claim 4, wherein said HII comprises a plurality of HII units, each of which comprises said buffer circuit, said register, and said time counter so as to simultaneously process a plurality of said local inquiry signals with respect to said HII units, said HII comprises:
    an arithmetic operator, coupled to each of said HII units at each said buffer circuit so as to orderly send said second bus inquiry signals to said bus.

6. The bus master of claim 4, wherein said buffer circuit comprises an address cache memory and a buffer arithmetic operator, in which said address cache memory is used for a fast access to said first bus inquiry signal so as to obtain an address information carried by said first bus inquiry signal, and said buffer arithmetic operator is used to send said second bus inquiry signal to said bus, according to said address information or said first bus inquiry signal that just arrives from said RIS.

7. The bus master of claim 4, wherein said delay time stored in said register is obtained by a method comprising of:
    setting said delay time to a presetting delay time;
    according to said delay time, informing said buffer circuit through said time counter to resend said bus signal to said bus;
    subtracting a delay decrement from said delay time to obtain a new delay time, if said bus does not response with said delay transaction termination and said delay time is greater an actual delay time for preparing data; and
    adding a delay increment to said delay time to obtain a new delay time, if said bus responds with a delay transaction termination,
    wherein said new delay time serves as said delay time for a next inquiry.

8. The bus master of claim 1, wherein said local inquiry signal equals to said first bus inquiry signal.

9. The bus master of claim 1, wherein said first bus inquiry signal equals to said second bus inquiry signal.

10. The bus master of claim 1, wherein said bus is also coupled to a target device, which comprises an ability to process a multiple delayed transaction.

11. The bus master of claim 1, wherein said bus comprises a peripheral component interconnect (PCI) bus.

12. An arbiter of a compatible peripheral component interconnect (PCI) master, which is coupled to a bus, said arbiter comprising:
- a rotating inquiry a rotating inquiry scheduler (RIS), coupled to a functional circuit; and
- a heuristic inquiry initiator (HII), coupled to said RIS and said bus,
- wherein said RIS receives and stores a local inquiry signal, produces a first bus inquiry signals, according to said local inquiry signal, and sends said first bus inquiry signal to said HII, which sends a second bus inquiry signal, according to said second bus inquiry signal, to said bus, in which said HII repeatedly sends said second bus inquiry signal to said bus to inquire a data status if said bus responds with a delay transaction termination, and said HII informs said RIS to perform a data transmission if said bus does not response with said delay transaction termination.

13. The arbiter of claim 12, wherein said RIS comprises an inquiry queue and a response queue, in which after said RIS receives said local inquiry signal issued by said functional circuit and stores it to said inquiry queue, said RIS sends said first bus inquiry signal, according to said local inquiry signal, to said HII, which is to get an authorization from said bus so as to send said second bus inquiry signal to said bus, and after said second bus inquiry signal is sent to said bus, said RIS removes said local inquiry signal stored in said inquiry queue and stores said local inquiry signal to said response queue.

14. The arbiter of claim 13, wherein if said bus does not response with said delay transaction termination, according to said local inquiry signal stored in said response queue, said RIS makes a data transmission route for said data transmission through said bus and clears said local inquiry signal stored in said response queue.

15. The arbiter of claim 12, wherein said HII comprises;
- a buffer circuit, coupled to said RIS so as to receive and temporarily store said first bus inquiry signal, and sends said second bus inquiry signal to said bus, according to said first bus inquiry signal;
- a register, used to store a delay time; and
- a time counter, which is coupled to said buffer circuit and said register, and is used to count a used time so that when said used time equals to said delay time, said time counter informs said buffer circuit to re-send said second bus inquiry signal to said bus.

16. The arbiter of claim 15, wherein said HII comprises a plurality of HII units, each of which comprises said buffer circuit, said register, and said time counter so as to simultaneously process a plurality of said local inquiry signals with respect to said HII units, said HII comprises:
- an arithmetic operator, coupled to said HII units at said buffer circuit so as to orderly send said second bus inquiry signals to said bus.

17. The arbiter of claim 15, wherein said buffer circuit comprises an address cache memory and a buffer arithmetic operator, in which said address cache memory is used for a fast access to said first bus inquiry signal so as to obtain an address information carried by said first bus inquiry signal, and said buffer arithmetic operator is used to send said second bus inquiry signal to said bus, according to said address information or said first bus inquiry signal that just arrives from said RIS.

18. The arbiter of claim 15, wherein said delay time stored in said register is obtained by a method comprising of:
- setting said delay time to a presetting delay time;
- according to said delay time, informing said buffer circuit through said time counter to resend said second bus signal to said bus;
- subtracting a delay decrement from said delay time to obtain a new delay time, if said bus does not response with said delay transaction termination and said delay time is greater an actual delay time for preparing data; and
- adding a delay increment to said delay time to obtain a new delay time, if said bus responds with said delay transaction termination,
- wherein said new delay time serves as said delay time for a next inquiry.

19. The arbiter of claim 12, wherein said local inquiry signal equals to said first bus inquiry signal.

20. The arbiter of claim 12, wherein said first bus inquiry signal equals to said second bus inquiry signal.

21. The arbiter of claim 12, wherein said bus is also coupled to a target device, which comprises an ability to process a multiple delayed transaction.

22. The arbiter of claim 12, wherein said bus comprises a peripheral component interconnect (PCI) bus.

23. An arbitrating method used by a compatible bus master, which is coupled to a bus, said arbitrating method comprising:
- providing a plurality of functional circuits, which respectively producing a plurality of local inquiry signals, wherein each of said local inquiry signals is used to make a request to use said bus for a data transaction;
- orderly storing said local inquiry signals, and accordingly producing a plurality of first bus inquiry signals;
- according to said first bus inquiry signals, producing a plurality of second bus inquiry signals, which are sent to said bus;
- repeatedly sending said second bus inquiry signals to said bus, in which said bus signals obtain a response with a delay transaction termination from said bus; and
- performing data transmission relevant to said bus inquiry signals, which obtain a response not being said delay transaction termination.

24. The arbitrating method of claim 23, said arbitrating method comprises:
- providing a delay time;
- starting to count a used deferring time for said second bus inquiry signals, which obtain said delay transaction termination responded from said bus;
- re-sending said second bus inquiry signals to said bus, when said used deferring time equals to said delay time.

25. The arbitrating method of claim 24, wherein said delay time is provided by a method comprising:
- setting said delay time to a presetting delay time;
- subtracting a delay decrement from said delay time to obtain a new delay time, if said bus does not response with said delay transaction termination and said delay time is greater an actual delay time for preparing data; and
- adding a delay increment to said delay time to obtain a new delay time, if said bus responds said delay transaction termination,
- wherein said new delay time serves as said delay time for a next inquiry.

26. The arbitrating method of claim 23, wherein said bus comprises a peripheral component interconnect (PCI) bus.

* * * * *